UNITED STATES PATENT OFFICE.

WM. H. H. GLOVER, OF NEW YORK, N. Y.

IMPROVED FERTILIZER.

Specification forming part of Letters Patent No. 43,639, dated July 26, 1864.

*To all whom it may concern:*

Be it known that I, WILLIAM H. H. GLOVER, of the city, county, and State of New York, have invented a certain new and useful Fertilizer, which I denominate the "Menhaden Fertilizer;" and I do hereby describe and ascertain my said invention in the following specification.

In the manufacture of fish-oil as heretofore conducted all the refuse water, gurry, &c., from the cooked fish, after pressing out and separating the oil therefrom was run off to waste. I discovered that this wasted product contained a very large amount of fertilizing ingredients suitable for manure, which could be saved and rendered available by mixing them with the vegetable formation of swamps of a peaty consistency generally known as "muck."

To obtain the best result, the muck should first be dried and placed in large vats in convenient positions, into which the refuse water and gurry before named is run from the oil-works, and they are carefully incorporated together with the muck or other like fertilizer.

The proportions of refuse water, gurry, and muck may vary according to the purpose for which the fertilizer is to be used.

The tanks being broad and shallow, the excess of moisture is readily evaporated without loss of fertilizing properties.

Having thus fully described my improved fertilizer, what I claim therein as new, and for which I desire to secure Letters Patent, is—

The combination of the muck or its equivalent with refuse water, gurry, &c., substantially as and for the purposes set forth, by which I am enabled to save and fix in a merchantable form the fertilizing properties contained therein that would otherwise run to waste.

WILLIAM H. H. GLOVER.

Witnesses:
ROBERT H. CABOTT,
SMITH GARDNER.